March 31, 1959     E. R. KIRKLAND, JR     2,879,618
RETRIEVER FOR AN UNDERWATER OBJECT
Filed Nov. 18, 1957
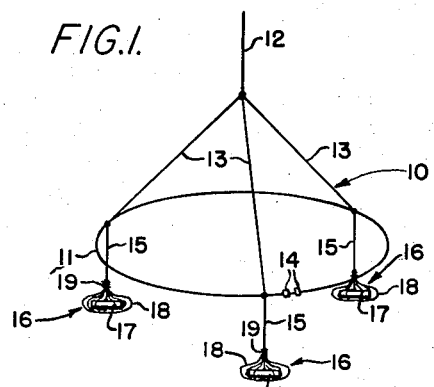
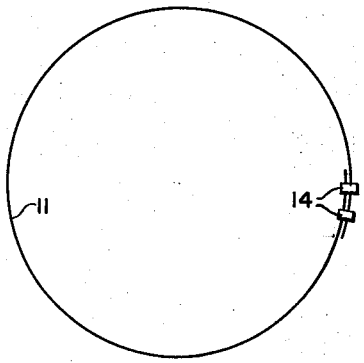
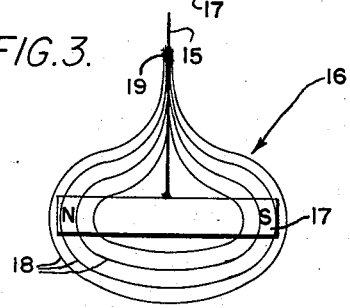
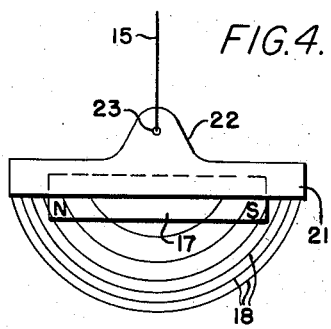
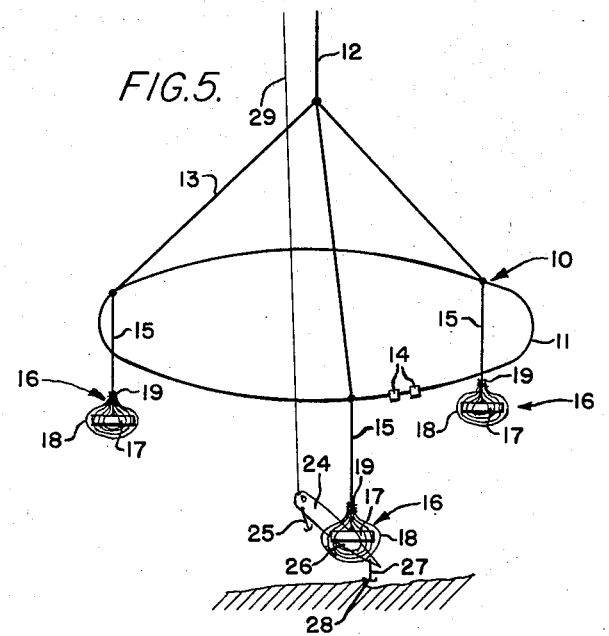
Inventor
E. R. KIRKLAND, JR.
By
N. F. Presson
Attorney ived along said line, a plurality of lines carried by said annular member and a magnetic retriever element secured to each of said plurality of lines whereby one of said magnetic projections may be magnetically engaged by said retriever element.

2,879,618

RETRIEVER FOR AN UNDERWATER OBJECT

Elmo R. Kirkland, Jr., Indian Head, Md.

Application November 18, 1957, Serial No. 697,155

7 Claims. (Cl. 43—17.2)

This invention relates generally to a grappling device for retrieving an object from beneath the surface of a body of water and more particularly to a retriever for recovering a fish lure or the like which has become fouled with a submerged snag on the bed of a body of water such that the lure cannot become dislodged by a reasonable tug on the fishing line.

It has been the usual practice heretofore when a lure becomes fouled within the water to attempt dislodgement of the lure by yanking or otherwise manipulating the fishing line. This procedure often results in breaking the line without effecting a recovery either of the lure or of the sinker, if employed, and in many instances in the loss of a substantial length of valuable fishing line.

By employing the present invention these disadvantages are obviated and the lure, sinker and line are retrieved easily, quickly and without the necessity of elaborate underwater operations.

One of the objects of the present invention is the provision of a new and improved retriever for an underwater object.

Another object is to provide a retriever for a subaqueously fouled fishing lure in which magnetic means are employed to facilitate an operative connection therewith.

A further object is to provide a retriever for a fishing lure which is guided along the fishing line secured to the lure to a subaqueous position such that one or more of the fishing hooks attached to the lure is securely engaged by the retriever and the provision of magnetic means carried by the retriever for facilitating such engagement.

Still other objects, advantages and improvements will be apparent from the following description taken in connection with the accompanying drawing in which:

Fig. 1 is a view in perspective of the retriever of the present invention in accordance with one embodiment thereof;

Fig. 2 is a plan view of a ring suitable for use with the device of Fig. 1;

Fig. 3 is an elevational view somewhat enlarged of one of the magnetic retriever elements of Fig. 1;

Fig. 4 is a view of a magnetic retriever element according to an alternative form of the invention, and;

Fig. 5 is a view of the retriever device engaging a snagged lure during a retrieving operation.

Referring now to the drawing, on which like or similar parts are designated by like numerals of reference, and more particularly to Fig. 1, thereof, there is shown thereon a retriever of the present invention indicated generally by the numeral 10 and comprising an annular member 11 composed preferably of nonmagnetic metal such, for example, as brass to which is secured a line 12 as by the bridle elements 13 connected thereto. Preferably, though not necessarily, the ring 11 may be adjustable to different diameters by reason of the provision of the members 14, Fig. 2, within which the end portions of the ring are slideably disposed, sufficient friction being present to maintain the ring in any selected adjusted position corresponding to the diameter thereof desired. The ring is also adapted to be disengaged at the members 14 as by withdrawing an end portion of the ring therefrom or, if desired, may be provided with a snap catch whereby the ring may be easily and quickly disposed in encirclement with a snagged fishing line or removed therefrom, as the case may be.

Secured to the ring by drop lines 15 are a plurality of magnetic retriever elements generally indicated by the numeral 16, each of said retriever elements including a permanent magnet 17 to which one end of the drop line 15 is secured in any suitable manner as illustrated. Each of the magnets 17 is surrounded by a plurality of loops of wire, cords or lines secured at the ends thereof to the line 15 as by the lashing 19 illustrated, as best shown on Fig. 3.

On Fig. 4 is shown a magnetic retriever suitable for use with the present invention according to another embodiment thereof. In this form of the invention the ends of the wires, cords or lines 18 are secured to a support 21 composed of any non-magnetic material suitable for the purpose such, for example, as a plastic having a magnet 17 carried thereby in such manner that the magnet is encircled by the loops 18. If desired, the magnet may be embedded in the support or otherwise secured thereto in any suitable manner. The magnet 17 may, if desired, be of the ceramic type and preferably coated with a suitable waterproof material to resist the corrosive effect of the water. The support is also preferably provided with a protuberance or upstanding portion 22 having an eyelet 23 therein for facilitating a connection with the drop line 12. It will be understood that the drop lines 15 are sufficiently short to prevent a pair of magnets 17 from engaging each other.

The operation of the device will now be described with particular reference to Fig. 5 on which is shown, by way of example, a fish lure 24 provided with a plurality of fish hooks 25, 26 and 27. Let it be assumed, by way of example, that the hook 27 is snagged on the bottom of a body of water at 28 such that it cannot be dislodged by a tug on line 29 secured to the lure. When this occurs, the annular member 11 is arranged around the fish line 29 and lowered by line 12 to a position such as the position shown whereby the hooks 25 and 26 are attracted by the magnet 17 in a direction toward the loops 18 of the retriever element 16. Let it further be assumed that hook 26 is moved sufficiently near the loops 18 to become entangled therewith thereby establishing a strong operative connection between the lure and the retriever. When this occurs the lure is retrieved by a pull on line 12.

It will be understood that although three magnetic retriever elements are disclosed on the drawing as being secured to the annular member 11, this has been done by way of example only, as a greater or lesser number of such elements may be employed, if desired. Furthermore, permanent magnets of circular configuration may be employed in lieu of the bar magnets illustrated and the support 21 may be configured, if desired, otherwise than as shown.

While the invention has been described with reference to two embodiments thereof which give satisfactory results, it is not so limited, as various changes and modifications will be apparent to those skilled in the art, after understanding the invention, and it is my invention, therefore, in the appended claims to cover all such changes and modifications.

What is claimed as new and desired to be secured by Letters Patent of the United States is:

1. A retriever for an underwater object having magnetic projections thereon and a line secured thereto comprising an annular member encirling said line and slideable therealong, a second line connected to said annular member for establishig a retrieving connection thereto, a plurality of magnets, a plurality of drop lines interconnecting said magnets and said annular member at intervals along the member, and a plurality of loops of lines connected to each of said drop lines and encircling each of said magnets for entanglement with said projections as the projections are attracted by the magnets.

2. A device for retrieving a fish lure have a plurality of ferric hooks pivoted thereto from a snagged position within a body of water and a fish line connected thereto, comprising in combination, an annular member for encircling said line and slideable therealong, a bridle connected to said member in a manner to support the member in a horizontal plane within the water, a retrieving line secured to said bridle, a plurality of magnets suspended from said member, and a plurality of loops of lines encircling each of said magnets and secured to said member for entanglement with at least one of said ferric hooks while the hooks are drawn by magnetic attraction toward at least one of said magnets into the path of movement of the loops of lines respective thereto as the annular member is moved along the fish line by said retrieving line.

3. A retrieving device according to claim 2 in which said annular member includes means for changing at will the diameter thereof.

4. A retrieving device according to claim 2 including a plurality of supports connected to said annular member to which said magnets are respectively secured.

5. A retrieving device according to claim 4 in which said loops of lines are carried by and secured to said supports.

6. A device for retrieving a submerged object having a line connected thereto and magnetic projections pivoted thereabout comprising a group of looped lines, magnetic means connected to said looped lines for moving said projections by magnetic attraction toward said looped lines sufficiently to become entangled therewith, and means secured to said looped lines for raising the looped lines, magnetic means and entangled object to the surface of the water.

7. A retrieving device according to claim 6 in which the raising means includes an annular member encircling said first named line and slideable therealong.

References Cited in the file of this patent

UNITED STATES PATENTS

| | | |
|---|---|---|
| 1,352,948 | Fiske | Sept. 14, 1920 |
| 2,405,655 | Kehoe | Aug. 13, 1946 |
| 2,557,789 | Lamka | June 19, 1951 |
| 2,598,487 | Anechiarico | May 27, 1952 |
| 2,676,430 | Richard | Apr. 27, 1954 |
| 2,801,489 | Gehring | Aug. 6, 1957 |